United States Patent
Nakayoshi et al.

(10) Patent No.: US 9,681,011 B2
(45) Date of Patent: Jun. 13, 2017

(54) ORIGINAL READING APPARATUS WITH ORIGINAL TRAY, AND CONTROL METHOD THEREFOR

(71) Applicant: CANON KABUSHIKI KAISHA, Tokyo (JP)

(72) Inventors: Asahiro Nakayoshi, Matsudo (JP); Hidenori Sunada, Abiko (JP); Satoshi Seki, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/993,135

(22) Filed: Jan. 12, 2016

(65) Prior Publication Data

US 2016/0205271 A1 Jul. 14, 2016

(30) Foreign Application Priority Data

Jan. 14, 2015 (JP) .................................. 2015-004926

(51) Int. Cl.
*G06F 15/00* (2006.01)
*H04N 1/00* (2006.01)

(52) U.S. Cl.
CPC ......... *H04N 1/0057* (2013.01); *H04N 1/0062* (2013.01); *H04N 1/00631* (2013.01); *H04N 1/00713* (2013.01)

(58) Field of Classification Search
None
See application file for complete search history.

(56) References Cited

U.S. PATENT DOCUMENTS

| 2004/0169886 A1* | 9/2004 | Mitani | G03G 15/5095 |
| | | | 358/1.16 |
| 2013/0242355 A1* | 9/2013 | Morita | H04N 1/00734 |
| | | | 358/449 |
| 2014/0118763 A1* | 5/2014 | Minakuchi | H04N 1/00763 |
| | | | 358/1.12 |

FOREIGN PATENT DOCUMENTS

JP 2011024098 A 2/2011

* cited by examiner

*Primary Examiner* — Helen Q Zong
(74) *Attorney, Agent, or Firm* — Rossi, Kimms & McDowell LLP

(57) ABSTRACT

An original reading apparatus includes an original tray. A conveyance unit conveys an original of an original bundle on the original tray. A reading unit reads the original conveyed. A first detection unit detects a first length of the original in a principal scanning direction. A second detection unit detects a second length of the original bundle in an auxiliary scanning direction. A third detection unit detects the original conveyed. A prediction unit predicts an original size by selecting from candidates corresponding to the first length in a first prediction mode, or by determining based on the first and second lengths in a second prediction mode. A specifying unit specifies the original size based on the first length and a length in the auxiliary scanning direction detected by the third detection unit. A change unit changes the prediction mode when the predicted original size differs from the specified original size.

10 Claims, 7 Drawing Sheets

| LENGTH IN PRINCIPAL SCANNING DIRECTION/mm | SENSOR 126: OFF SENSOR 127: OFF | SENSOR 126: ON SENSOR 127: OFF | SENSOR 126: ON SENSOR 127: ON |
|---|---|---|---|
| −165.00 | A5R | A5R | A5R |
| 165.00−196.00 | B5R | B5R | B5R |
| 196.00−213.90 | A5 | A4R | A4R |
| 213.90−263.50 | B5 | B4R | B4R |
| 263.50− | A4 | A3 | A3 |

| LENGTH IN PRINCIPAL SCANNING DIRECTION/mm | REGULAR CANDIDATE | PREDICTED ORIGINAL SIZE |
|---|---|---|
| −143.85 | STMTR | STMTR |
| 143.85−165.00 | A5R | A5R |
| 165.00−196.00 | B5R/B6 | B5R |
| 196.00−213.90 | A4R/A5 | A4R |
| 213.90−236.45 | LGL/LTRR/STMT | LTRR |
| 236.45−263.50 | B4R/B5 | B5 |
| 263.50−288.20 | LDR/LTR | LTR |
| 288.20− | A3/A4 | A4 |

ORIGINAL READING APPARATUS WITH ORIGINAL TRAY, AND CONTROL METHOD THEREFOR

BACKGROUND OF THE INVENTION

Field of the Invention

The present invention relates to an original reading apparatus equipped with an original tray, and control method for the original reading apparatus.

Description of the Related Art

An original reading apparatus in recent years is provided with an automatic original feeding device (hereinafter referred to as an "ADF") that conveys an original automatically. An original reading apparatus optically reads an original conveyed by an ADF, and generates image data. The generated image data is stored in an image memory of the original reading apparatus.

Since a memory area that is needed to store image data is reserved in the image memory on the basis of a size of an original, it is necessary to grasp a size of an original before reading the original in order to reserve a needed memory area.

There is a known original reading apparatus that is provided with sensors that detect a length and a width of an original on an original tray of an ADF, specifies candidates of the size of the original that may correspond to the detected results, and selects the maximum size among the specified candidates as a temporary size when an original bundle that includes a plurality of sizes of originals (a size mixed original bundle) is stacked on the original tray (for example, see Japanese Laid-Open Patent Publication (Kokai) No. 2011-24098 (JP 2011-24098A)).

However, since the original reading apparatus in the above-mentioned publication selects the maximum size as a temporary size of the originals among the candidates of the size of the original on the basis of the detection results, a superfluous memory area is reserved in the image memory as compared with an actually needed memory area when the original to be read is smaller than the temporary size. As a result, a memory area needed for a next process may not be reserved, which keeps the next process waiting until a necessary memory area will be reserved. That is, the original reading apparatus in the above-mentioned publication may be in a suspended state until a memory area needed to perform a process after reading an original is reserved. As a result, the throughput of various processes performed by the original reading apparatus concerned drops.

SUMMARY OF THE INVENTION

Accordingly, a first aspect of the present invention provides an original reading apparatus including an original tray on which an original bundle including a plurality of originals is stacked, a conveyance unit configured to convey an original of the original bundle stacked on the original tray one by one along a conveyance path, a reading unit configured to read the original conveyed, a first detection unit configured to detect a length of the original conveyed in a first direction that intersects perpendicularly to a conveyance direction, a second detection unit configured to detect a length of the original bundle stacked on the original tray in a second direction in which the original is conveyed, a third detection unit configured to be provided on the conveyance path to detect the original conveyed by the conveyance unit, a prediction unit configured to predict a size of the original conveyed using one mode among a plurality of prediction modes, which include a first prediction mode in which one size is selected as the size of the original conveyed from among a plurality of candidates of original sizes corresponding to the length of the original in the first direction detected by the first detection unit, and a second prediction mode in which the size of the original conveyed is predicted based on the length in the first direction detected by the first detection unit and the length in the second direction detected by the second detection unit, a specifying unit configured to specify the size of the original conveyed based on the length in the first direction detected by the first detection unit and the length in the second direction detected by the third detection unit, and a change unit configured to change the prediction mode used by the prediction unit when the original size predicted by the prediction unit differs from the original size specified by the specifying unit.

Accordingly, a second aspect of the present invention provides a control method for an original reading apparatus equipped with an original tray on which an original bundle including a plurality of originals is stacked, the control method including a conveyance step of conveying an original of the original bundle stacked on the original tray one by one along a conveyance path, a reading step of reading the original conveyed, a first detection step of detecting a length of the original conveyed in a first direction that intersects perpendicularly to a conveyance direction, a second detection step of detecting a length of the original bundle stacked on the original tray in a second direction in which the original is conveyed, a third detection step of detecting the original conveyed in the conveyance step with a sensor provided on the conveyance path, a prediction step of predicting a size of the original conveyed using one mode among a plurality of prediction modes, which include a first prediction mode in which one size is selected as the size of the original conveyed from among a plurality of candidates of original sizes corresponding to the length of the original in the first direction detected in the first detection step, and a prediction mode in which the size of the original conveyed is predicted based on the length in the first direction detected in the first detection step and the length in the second direction detected in the second detection step, a specifying step of specifying the size of the original conveyed based on the length in the first direction detected in the first detection step and the length in the second direction detected in the third detection step, and a change step of changing the prediction mode used in the prediction step when the original size predicted in the prediction step differs from the original size specified in the specifying step.

According to the present invention, the original reading apparatus and the control method therefor that are capable of suppressing superfluous reservation of a memory area are provided.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
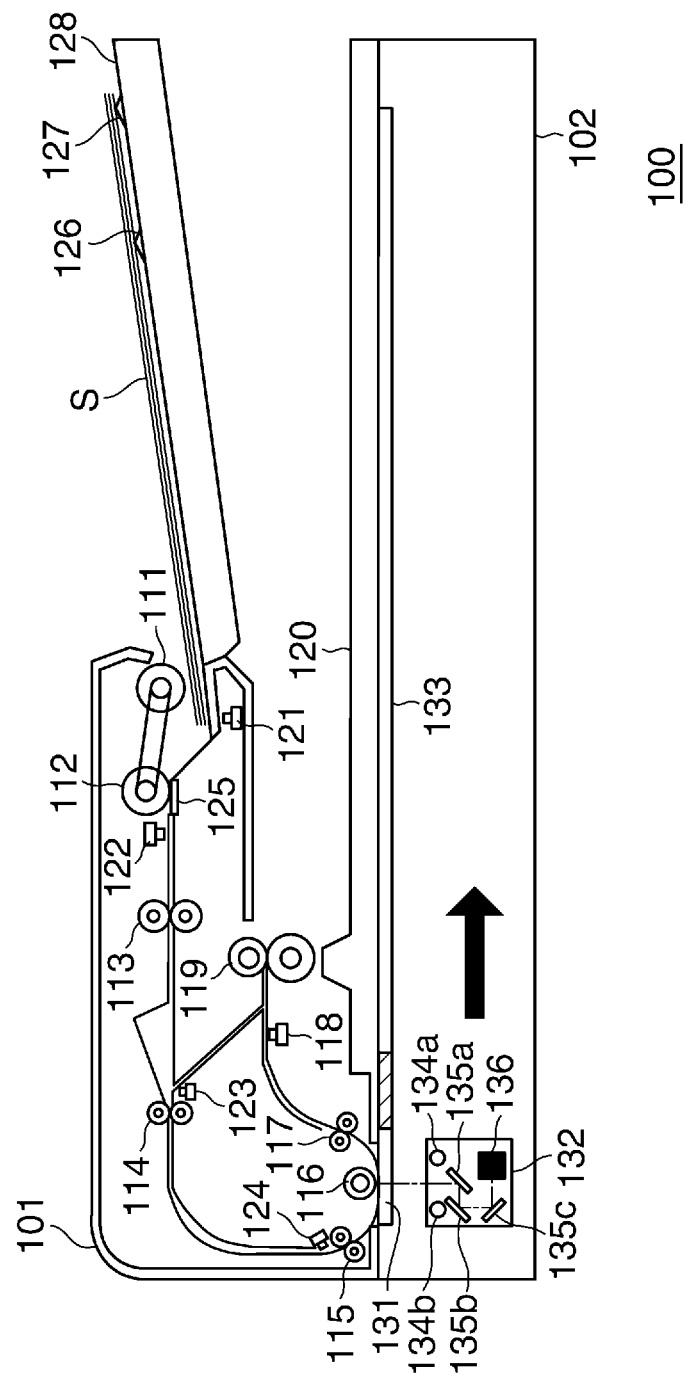
FIG. 1 is a sectional view schematically showing an original reading apparatus according to an embodiment of the present invention.

FIG. 1 is a sectional view schematically showing an original reading apparatus 100 according to an embodiment.

Figure 2:
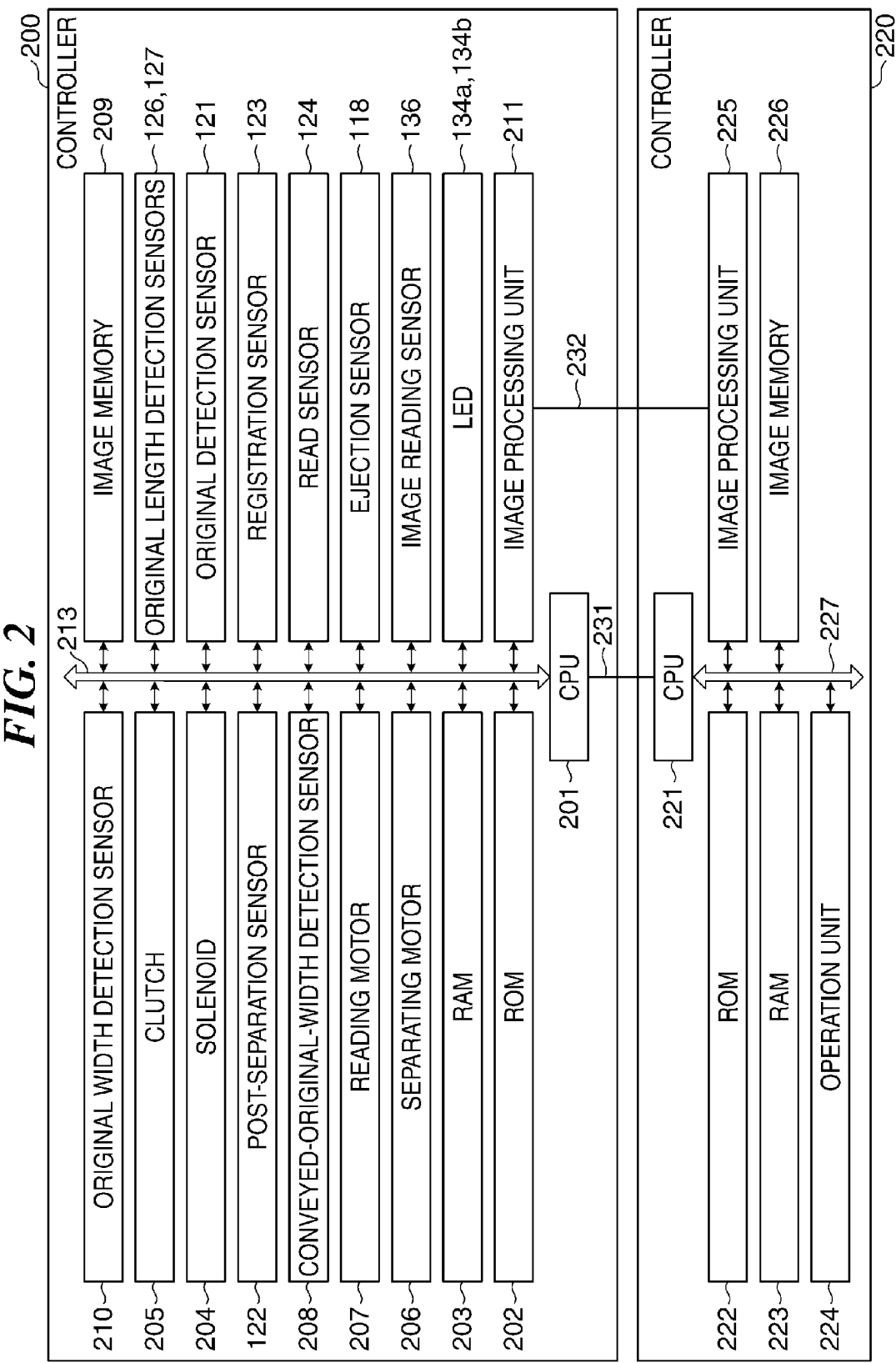
FIG. 2 is a block diagram showing internal configurations of a controller of an ADF and a controller of an image reading section in FIG. 1.

The original reading apparatus 100 of FIG. 1 is provided with an ADF 101, an image reading section 102, and controllers 200 and 220 (see FIG. 2). It should be noted that the original reading apparatus 100 in FIG. 1 may constitute an image reading system by connecting with a PC (not shown) that is an information processing apparatus.

The ADF 101 is provided with a feed roller 111, a separation roller 112, a drawing roller pair 113, a registration roller pair 114, an upstream reading roller pair 115, a reading roller 116, a downstream reading roller pair 117, an ejection sensor 118, an ejecting roller pair 119, a sheet ejection tray 120, an original detection sensor 121, a post-separation sensor 122, a registration sensor 123, a read sensor 124, a separation pad 125, original length detection sensors 126 and 127 (a second detection unit), and an original tray 128.

The image reading section 102 is provided with a moving reading glass 131, an optical scanner unit 132, and an original tray glass 133. The optical scanner unit 132 is provided with LEDs 134a and 134b, mirrors 135a, 135b, and 135c, and an image reading sensor 136.

There are two reading modes. One is a stationary original reading mode in which an original placed on the original tray glass 133 is read. The other is a moving original reading mode in which an original stacked on the ADF 101 is read. In the stationary original reading mode, the original placed on the original tray glass 133 is read by scanning with the optical scanner unit 132 that moves at a constant speed in an auxiliary scanning direction (a direction of the arrow in FIG. 1, a second direction).

In the moving original reading mode, the original conveyed by the ADF 101 is read without moving the optical scanner unit 132 from the position shown in FIG. 2. In the moving original reading mode, when the feed roller 111 contacts with an upper surface of an original bundle S stacked on the original tray 128 and rotates, the uppermost original of the original bundle S is conveyed. At this time, if a plurality of originals including the uppermost original of the original bundle S are conveyed, the separation roller 112 and the separation pad 125 separate only the uppermost original, and only the uppermost original is conveyed. The conveyed uppermost original of the original bundle S passes the post-separation sensor 122, the drawing roller pair 113, and the registration sensor 123 in order, and stops at the registration roller pair 114. An original may skew while being conveyed. When the original stops by the registration roller pair 114, the original bends in a looped shape. The skew is canceled when the bending is canceled.

Next, when a front face of an original is read, the original is conveyed to an image reading position between the moving reading glass 131 and the reading roller 116 after passing through the read sensor 124 and the upstream reading roller pair 115 in order, and the front face is irradiated with a LED light from the LEDs 134a and 134b while passing through the image reading position. The image reading sensor 136 detects the reflected light obtained by irradiating with the LED light through the mirrors 135a, 135b, and 135c, and reads the image of the front face of the original. The original that passed through the image reading position is conveyed to the downstream reading roller pair 117.

When a back face of an original is read, the original passes the ejection sensor 118 after passing the downstream reading roller pair 117. Then, when the original reaches the ejecting roller pair 119, the original is stopped before passing through the ejecting roller pair 119, and the original is reversed by rotating the ejecting roller pair 119 in a reverse direction to convey the original to the registration roller pair 114 (hereinafter referred to as a "reversal process"). Next, the original is conveyed to the image reading position, and the back face of the original is read as with the reading of the front face of the original. After passing through the downstream reading roller pair 117 and the ejection sensor 118, the original is stopped before passing through the ejecting roller pair 119, the reversal process is performed, and the original is conveyed to the downstream reading roller pair 117 without reading an image.

The original that is conveyed by the downstream roller pair 117 after the front face of the original has been read is further conveyed to the sheet ejection tray 120 through the ejection sensor 118 and the ejecting roller pair 119 in order, and the reading of the original in the moving original reading mode finishes.

FIG. 2 is a block diagram showing internal configurations of a controller 200 of the ADF 101 and a controller 220 of the image reading section 102 in FIG. 1.

As shown in FIG. 2, the controller 200 has a CPU 201, a ROM 202, a RAM 203, a solenoid 204, a clutch 205, a separating motor 206, a reading motor 207, an ejection sensor 118, an original detection sensor 121, a post-separation sensor 122, a conveyed-original-width detection sensor 208, a registration sensor 123, a read sensor 124, an original length detection sensors 126 and 127, an original width detection sensor 210 (a first detection unit), LEDs 134a and 134b, an image reading sensor 136, an image memory 209, and an image processing unit 211, and these are mutually connected through a bus 213.

The controller 220 has a CPU 221, a ROM 222, a RAM 223, an operation unit 224, an image processing unit 225, and an image memory 226, and these are mutually connected through a bus 227.

The CPU 201 and the CPU 221 are connected through a communication line 231, and the image processing unit 211 and the image processing unit 225 are connected through an image line 232. The CPU 201 performs a control program stored in the ROM 202. Moreover, the CPU 201 predicts and specifies an original size, and reserves a memory area corresponding to the specified original size in the image memory 226. The image data output from the image reading sensor 136 is stored into the memory area reserved in the image memory 226. The image data stored in the image memory 226 is read and developed onto the RAM 223, and the image processing unit 211 applies an image process to the image data developed onto the RAM 223. The image data to which the image process is applied is transmitted to the image processing unit 225.

Furthermore, the CPU 201 generates a vertical synchronizing signal indicating a front end of image data and a horizontal synchronizing signal indicating a front end of pixels for one scan in a principal scanning direction (a first direction), and transmits the generated signals to the CPU 221 through the communication line 231 at a timing for reading an original. The RAM 203 stores input data and working data.

The solenoid 204 changes separation and contact of a pair of rollers constituting the ejecting roller pair 119. The clutch 205 changes drive and stop of the registration roller pair 114 etc. The separating motor 206 is a pulse motor that drivingly rotates the feed roller 111, the separation roller 112, the drawing-out roller 3, and the registration roller pair 114. The number of driving pulses of the separating motor 206 is used when computing an original length in the conveyance direction. The reading motor 207 is a pulse motor that drives the upstream reading roller pair 115, the reading roller 116, the downstream reading roller pair 117, and the ejecting roller pair 119.

The ejection sensor 118 and the post-separation sensor 122 detect a rear end of an original conveyed. The registration sensor 123 and the read sensor 124 detect a front end of an original conveyed. The original detection sensor 121 detects whether any original is on the original tray 128. The conveyed-original-width detection sensor 208 detects a length in the principal scanning direction of an original under conveyance. The original length detection sensors 126 and 127 detect a length in the auxiliary scanning direction of an original when the original bundle S is stacked on the original tray 128. The original width detection sensor 210 detects a length in the principal scanning direction of an original when the original bundle S is stacked on the original tray 128. The auxiliary scanning direction is equivalent to the conveyance direction of an original, and the principal scanning direction is equivalent to the direction that intersects perpendicularly with the auxiliary scanning direction.

The LEDs 134a and 134b irradiate an original with LED light. The image reading sensor 136 reads the original, and outputs image data. The image data output from the image reading sensor 136 is temporarily stored in the image memory 209. The image processing unit 211 applies a shading process and various kinds of filtering processes to the read image data.

The CPU 221 performs a control program stored in the ROM 222. Moreover, the CPU 221 notifies the CPU 201 of an instruction received from a user through the operation unit 224. The RAM 223 stores input data and working data. The image processing unit 225 receives the image data to which the image processing unit 211 applied the processes through the image line 232, applies predetermined image processes, such as color adjustment, to the received image data, and stores it in the image memory 226.

Figures 3, 4:
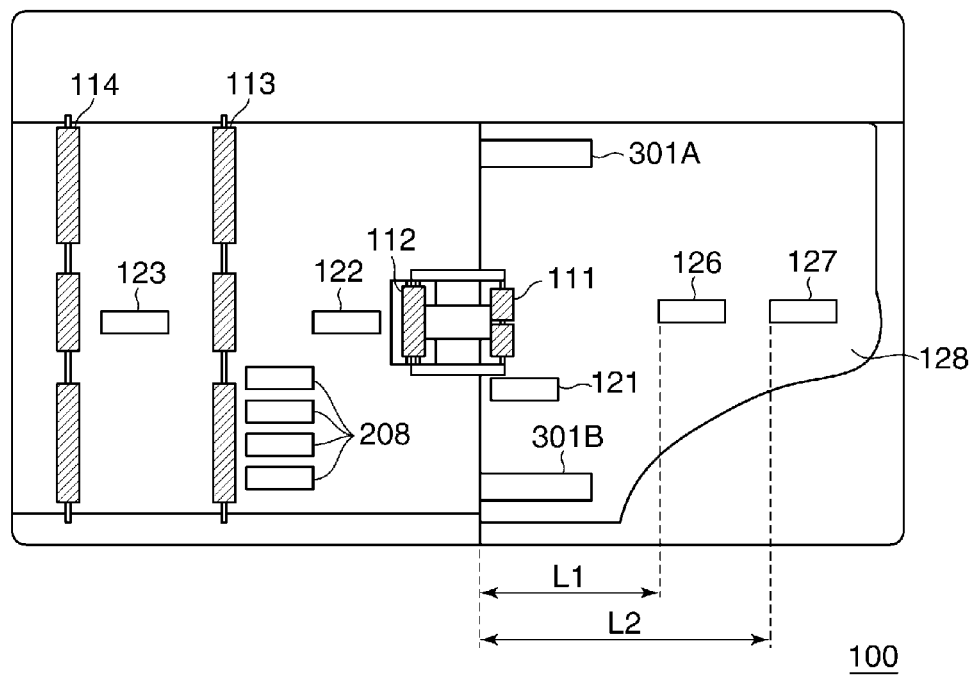
FIG. 3 is a plan view showing arrangements of sensors and rollers in the original reading apparatus in FIG. 1.
FIG. 4 is a view showing a size specifying table for specifying a size of an original based on results detected by original length detection sensors and an original width detection sensor in FIG. 2.

FIG. 3 is a plan view showing arrangements of the sensors and the rollers in the original reading apparatus 100 in FIG. 1.

The feed roller 111 and the separation roller 112 are arranged at the center in the principal scanning direction so as to contact with only a center of an original. The drawing roller pair 113 and the registration roller pair 114 are arranged over the entire width of the conveyance path so as to contact with the entire original. The original detection sensor 121 is arranged on the left side in the conveyance direction with respect to the center of the conveyance path to avoid interference with the feed roller 111. The post-separation sensor 122 is arranged at the center of the conveyance path following the separation roller 112. The conveyed-original-width detection sensor 208 is arranged on the left side in the conveyance direction, and consists of a plurality of detection parts (four parts, in this example) so as to enable to detect a plurality of original widths. The registration sensor 123 and the original length detection sensors 126 and 127 are arranged at the center of the conveyance path. Original guide plates 301A and 301B are provided at both sides of the original tray 128 in the principal scanning direction.

The original guide plates 301A and 301B move in conjunction with each other about the center in the principal scanning direction of the original tray 128 as boundary. The positions of the original guide plates 301A and 301B are adjusted by a user so as to agree with a width (a length in the principal scanning direction) of an original stacked on the original tray 128.

The original length detection sensors 126 and 127 detect whether an original is positioned at the respective sensors. The detection results of the original length detection sensors 126 and 127 are used for specifying an original length in the conveyance direction (a length in the auxiliary scanning direction). The original width detection sensor 210 (see FIG. 2) detects an interval (a length in the principal scanning direction) of the original guide plates 301A and 301B adjusted by the user.

FIG. 4 is a view showing a size specifying table (size specifying information) 400 for specifying a size of an original based on results detected by the original length detection sensors 126 and 127 and the original width detection sensor 210.

The size specifying table 400 in FIG. 4 is used when predicting a size of an original in a tray-size priority mode mentioned later, and is stored in the RAM 203. As shown in FIG. 4, the size specifying table 400 shows candidates of a size of an original specified on the basis of a length in the principal scanning direction of an original detected by the original width detection sensor 210 and detection results of the original length detection sensors 126 and 127 (i.e., whether there is an original). A length in the auxiliary scanning direction of an original is narrowed down by detecting whether there is an original (ON or OFF) by the original length detection sensors 126 and 127. For example, when the original length detection sensor 126 detects that there is no original (OFF), candidates are narrowed down to sizes of originals of which length in the auxiliary scanning direction is short (shorter than a length L1 in FIG. 3). When the original length detection sensor 127 detects that there is an original (ON), candidates are narrowed down to sizes of originals of which length in the auxiliary scanning direction is long (longer than a length L2 in FIG. 3).

A size of an original is specified as follows using the size specifying table 400. For example, when the original width detection sensor 210 detects that a length of an original in the principal scanning direction is 297 mm, the detected length of 297 mm belongs to a classification "263.50 mm or more" of the length in the principal scanning direction in the size specifying table 400, and the original size specified is narrowed down to A4 or A3. In addition, when both the original length detection sensors 126 and 127 detect that there is no original, the original size is specified to A4. On the other hand, when the original length detection sensor 126 detects that there is an original and the original length detection sensor 127 detects that there is no original, or when both the original length detection sensors 126 and 127 detect that there is an original, the original size is specified to A3.

Figures 5, 6:
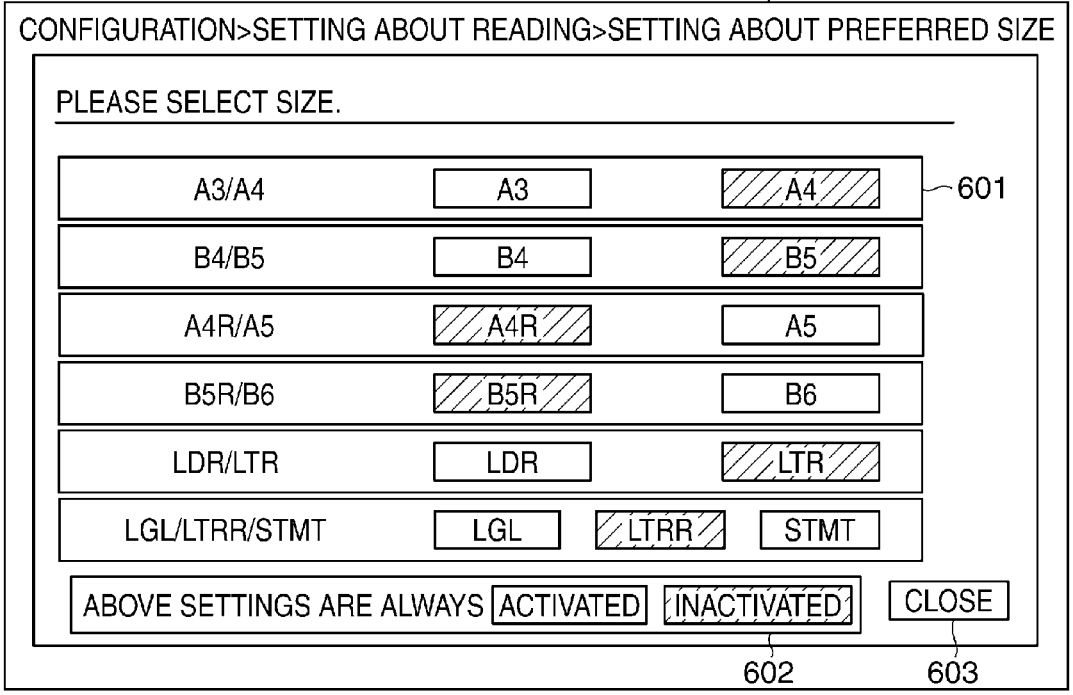
FIG. 5 is a view showing a prediction list stored in a RAM shown in FIG. 2.
FIG. 6 is a view showing a preferred size setting screen displayed when a user determines a preferred size as a predicted original size when there are a plurality of regular candidates in FIG. 5.

FIG. 5 is a view showing a prediction list (prediction data) 500 stored in the RAM 203 shown in FIG. 2.

The prediction list 500 in FIG. 5 is used when predicting an original size in a list reference mode mentioned later. As shown in FIG. 5, the prediction list 500 shows regular candidates of original sizes corresponding to original lengths in the principal scanning direction detected by the original width detection sensor 210. When there are a plurality of regular candidates in a classification, one of the regular candidates is listed as an original size that is predicted with priority (hereinafter referred to as a "predicted original size").

For example, when the original width sensor 210 detects that a length of an original in the principal scanning direction is 297 mm, the detected length of 297 mm belongs to a classification "288.20 mm or more" of the length in the principal scanning direction in the prediction list 500, and the original size specified is narrowed down to A4 or A3.

Then, A4 is selected as a predicted original size among the regular candidates of A3 and A4 in the prediction list 500. That is, when there are a plurality of regular candidates in a classification of a length in the principal scanning direction, one of the plurality of regular candidates of the original size is set beforehand as a predicted original size.

A method of selecting one of a plurality of regular candidates in the prediction list 500 as a predicted original size is not limited in particular. For example, a generally frequently-used regular candidate may be selected as a predicted original size, or a regular candidate with the minimum area may be selected as a predicted original size. When the regular candidate of the minimum area is selected as a predicted original size, superfluous reservation of an image memory is reduced. Moreover, a predicted original size in the prediction list 500 may be changed on the basis of selection history of the predicted original size. For example, the original reading apparatus 100 may store the history of the original size that a user used, and may change the predicted original size in the prediction list to the highly-used original size that is found on the basis of the history. Furthermore, the original reading apparatus 100 of the embodiment may store an original size that the user designated on a preferred size setting screen 600 in FIG. 6 mentioned later into the prediction list as a predicted original size. That is, the original size that the user intends may be employed as a predicted original size. Although regular sizes of original sheets may differ for each country and region, the regular sizes of original sheets used commonly in all the countries and regions may be employed as regular candidates in the prediction list 500.

FIG. 6 is a view showing the preferred size setting screen 600 displayed when a user determines a preferred size as a predicted original size when there are a plurality of regular candidates in FIG. 5.

The preferred size setting screen 600 in FIG. 6 includes a selection column 601, an all-time activation button 602, and a close button 603. When a plurality of regular candidates of an original size are predicted based on an original length in the principal scanning direction, all the regular candidates of the original size are displayed in the selection column 601. The user selects a desired size from among the displayed regular candidates of the original size as a predicted original size. Accordingly, a user's intention is reflected to the selection of the predicted original size.

The all-time activation button 602 is used to activate a preferred size setting at all the time and to inactivate the setting. When the preferred size setting is activated at all the time, the size selected in the selection column 601 is always used as the predicted original size. The close button 603 is used to close the preferred size setting screen 600. The predicted original size selected through the preferred size setting screen 600 is stored in the RAM 203.

Figure 7A:
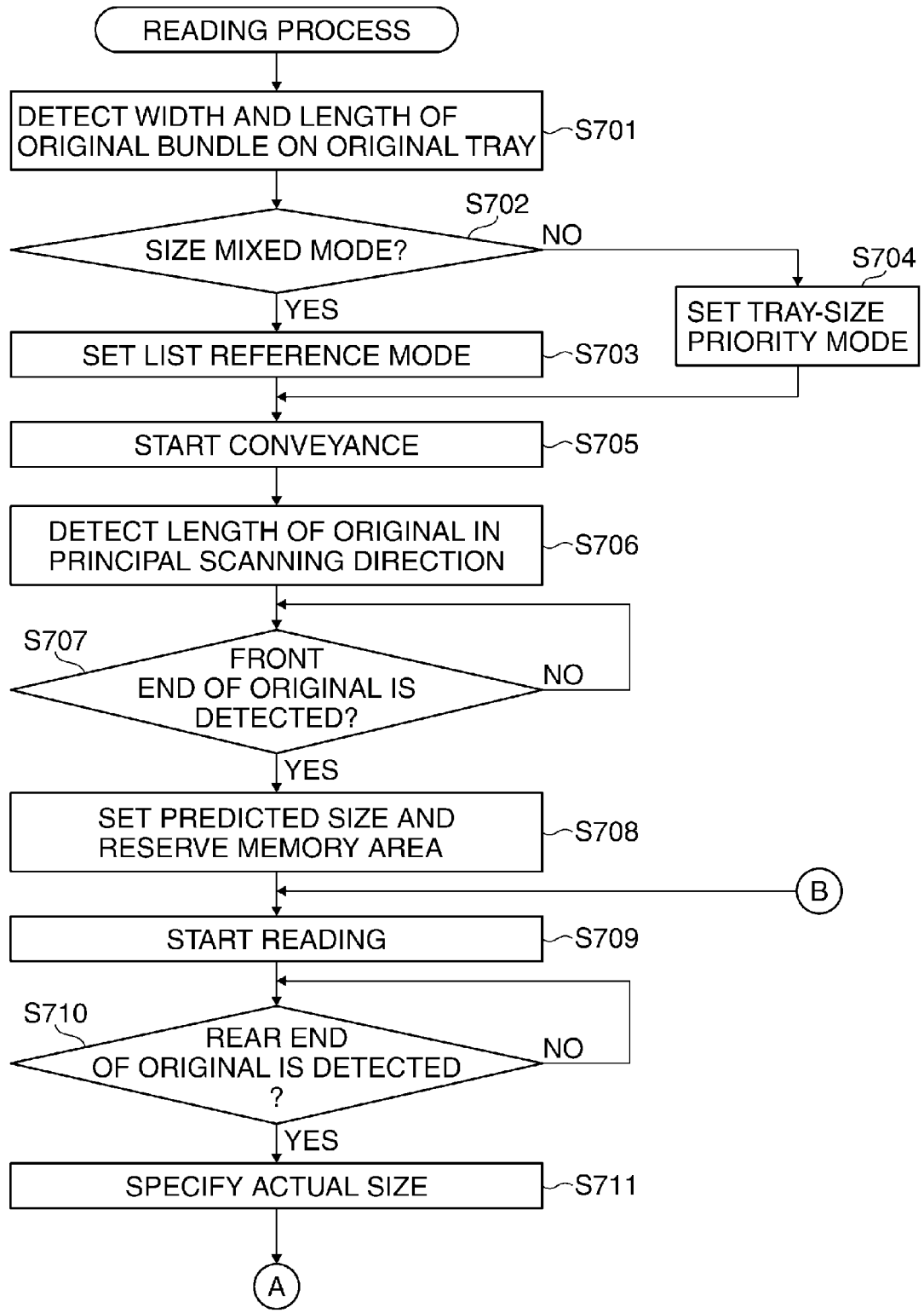
FIG. 7A and FIG. 7B are flowcharts showing procedures of a reading process performed by the original reading apparatus in FIG. 1.
Figure 7B:
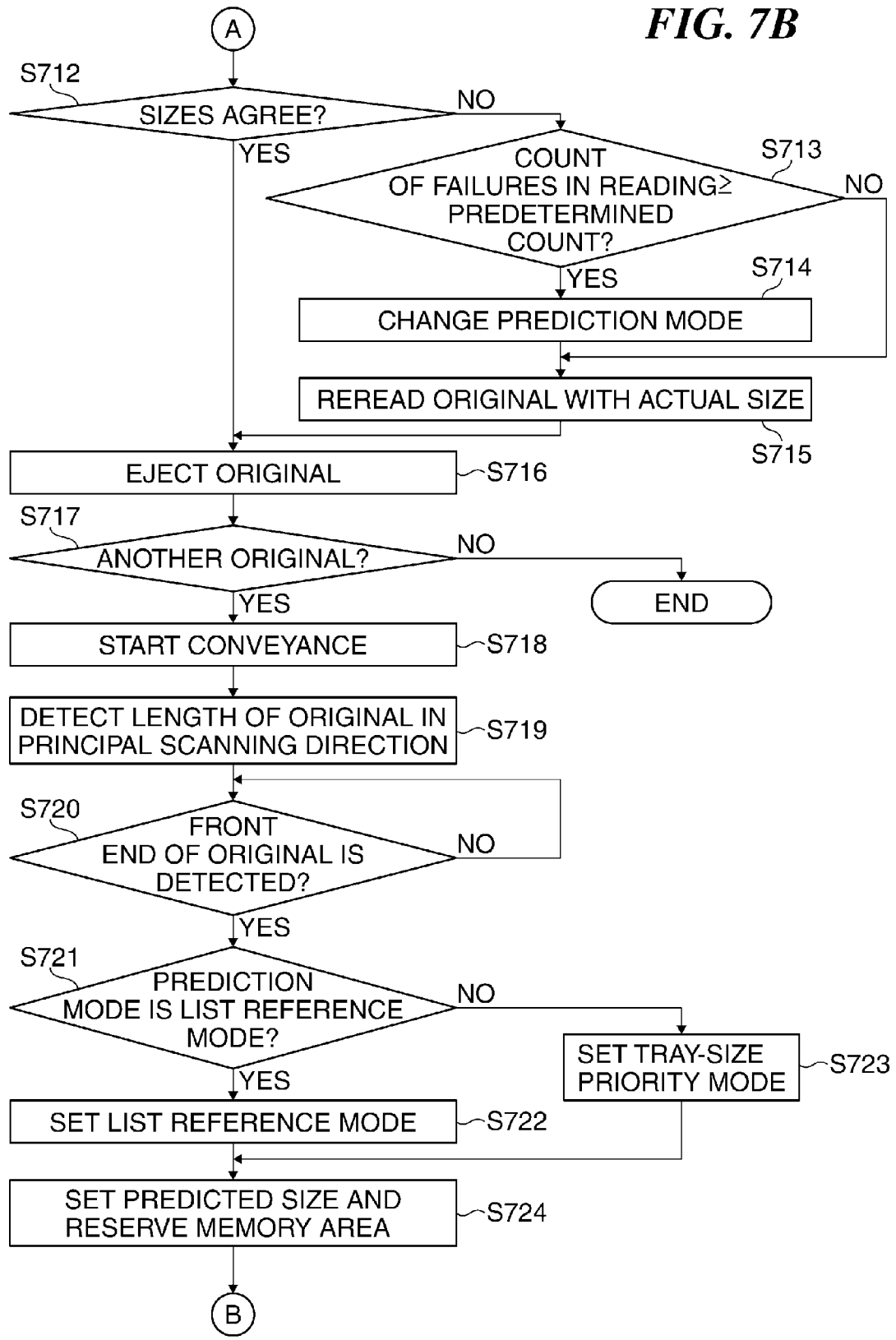

FIG. 7A and FIG. 7B are flowcharts showing procedures of a reading process performed by the original reading apparatus 100 in FIG. 1. The following description describes the procedures for reading only one side of an original.

The CPU 201 detects the width in the principal scanning direction and the length in the auxiliary scanning direction of the original bundle S stacked on the original tray 128 on the basis of the detection results of the original length detection sensor 126 and 127 and the original width detection sensor 210 (step S701). Then, the CPU 201 determines whether a reading mode is a size mixed mode (step S702). The size mixed mode is a reading mode used when the original bundle S includes originals of a plurality of different sizes. The size mixed mode is set to the original reading apparatus 100, when a user designates the size mixed mode through the operation unit 224.

As a result of the determination in the step S702, when the reading mode is the size mixed mode, the CPU 201 sets up the list reference mode (a first prediction unit) as a prediction mode (step S703). On the other hand, when the reading mode is not the size mixed mode, the CPU 201 sets up the tray-size priority mode (a second prediction unit) as the prediction mode (step S704).

When the list reference mode is set up as the prediction mode, the size of an original is predicted using the prediction list 500. Moreover, when the tray-size priority mode is set up, the size of an original is predicted using the size specifying table 400.

Next, the CPU 201 controls the separating motor 206, the reading motor 207, etc. to start conveyance of an original (step S705). The CPU 201 obtains the detection result of the conveyed-original-width detection sensor 208 about the original currently conveyed. Then, the CPU 201 determines a length of the principal scanning direction of the conveyed original (an actual length of the principal scanning direction of the original) on the basis of the detection result of the conveyed-original-width detection sensor 208 and the detection result of the original width detection sensor 210 obtained in the step S701 (step S706).

When a plurality of originals are stacked on the original tray 128, the original width detection sensor 210 detects the length of the originals in the principal scanning direction according to the interval between the original guide plates 301A and 301B set on the original tray 128. For example, when a plurality of originals of which lengths in the principal scanning direction are different are stacked on the original tray 128 in the size mixed mode, a sheet size determined on the basis of the detection result of the original width detection sensor 210 may not agree with a sheet size of an original conveyed actually, because the original width detection sensor 210 detects the largest length in the principal scanning direction. Accordingly, the CPU 201 determines the length of the conveyed original in the principal scanning direction using the detection result of the conveyed-original-width detection sensor 208 and the detection result of the original width detection sensor 210 in the step S706.

Then, the CPU 201 determines whether the registration sensor 123 detects the front end of the original conveyed (step S707). When the registration sensor 123 detects the front end of the original conveyed (YES in the step S707), the CPU 201 sets up a predicted size and reserves a memory area corresponding to the set-up predicted size in the image memory 226 (step S708).

When the list reference mode is set up as the prediction mode, the predicted size of the original is determined with reference to the prediction list 500 on the basis of the length of the original in the principal scanning direction determined in the step S706. On the other hand, when the tray-size priority mode is set up as the prediction mode, the predicted size of the original is determined with reference to the size specifying table 400 on the basis of the length of the original in the principal scanning direction determined in the step S706 and the length of the original bundle S in the auxiliary scanning direction detected in the step S701.

When the CPU 201 is not able to reserve a memory area corresponding to the predicted size in the step S708, the original currently conveyed is stopped at the position of the registration roller pair 114 until the memory area is reserved.

Next, the CPU 201 starts reading the original by controlling the image reading sensor 136 in synchronization with the timing at which the front end of the original conveyed arrives at the image reading position (step S709). Image data output from the image reading sensor 136 is stored in the memory area reserved in the image memory 226. The image reading sensor 136 reads the original on the basis of the set-up predicted size under the control of the CPU 201. In other words, the image reading sensor 136 starts reading the original and stops reading on the basis of the set-up predicted size.

The CPU 201 determines whether the post-separation sensor 122 detects the rear end of the original (step S710). The detection of the rear end of the original enables to specify the length of the original in the auxiliary scanning direction. The CPU 201 computes the length of the original in the auxiliary scanning direction on the basis of a count value of motor pulses output to the separating motor 206 from the timing at which the front end of the original conveyed is detected by the registration sensor 123 to the timing at which the rear end of the original is detected by the post-separation sensor 122 and the distance between the registration sensor 123 and the post-separation sensor 122 along the conveyance path. It should be noted that the length of the original in the auxiliary scanning direction may be computed on the basis of a time period between the timing at which the front end of the original conveyed is detected by the registration sensor 123 and the timing at which the rear end of the original is detected by the post-separation sensor 122 and a rotational velocity of the separating motor 206 during the time period concerned.

After the post-separation sensor 122 detects the rear end of the original, the CPU 201 specifies the actual size of the original (step S711). Specifically, the CPU 201 specifies the size of the original on the basis of the length of the original in the auxiliary scanning direction, which is computed according to the detection timing of the front end of the original detected in the step S707 and the detection timing of the rear end of the original detected in the step S710, and the length of the original in the principal scanning direction detected in the step S706.

Next, the CPU 201 determines whether the predicted size set up in the step S708 agrees with the actual size of the original specified in the step S711 (step S712 in FIG. 7B).

When the set-up predicted size agrees with the specified actual size of the original (YES in the step S712), the CPU 201 determines that the original has been read normally, and makes the original be ejected to the sheet ejection tray 120 (step S716). On the other hand, when the set-up predicted size does not agree with the specified actual size of the original (NO in the step S712), the CPU 201 determines that the reading of the original failed, and determines whether the count of failures in reading an original reaches the predetermined count set by the user beforehand (step S713).

When the count of failures in reading an original does not reach the predetermined count set by the user beforehand (NO in the step S713), the CPU 201 proceeds with the process to step S715 without changing the prediction mode. On the other hand, when the count of failures in reading an original reaches the predetermined count set by the user beforehand (YES in the step S713), the CPU 201 changes the prediction mode (step S714). When the prediction mode is setting in the list reference mode, it is changed to the tray-size priority mode. On the contrary, when the prediction mode is setting in the tray-size priority mode, it is changed to the list reference mode. Then, the CPU 201 rereads an original (step S715) on the basis of the actual size of the original specified in the step S711, and proceeds with the process to the step S716.

The original reading apparatus 100 of the embodiment has a function to perform a reversing process. The image on the same side of the same original is able to be reread by performing the reversing process twice to the original that failed in reading.

It is preferable to change the prediction mode in the step S714, when sizes of all or almost originals that will be read after changing the prediction mode are continuously identical. Specifically, it will be described as follows.

Figure 8:
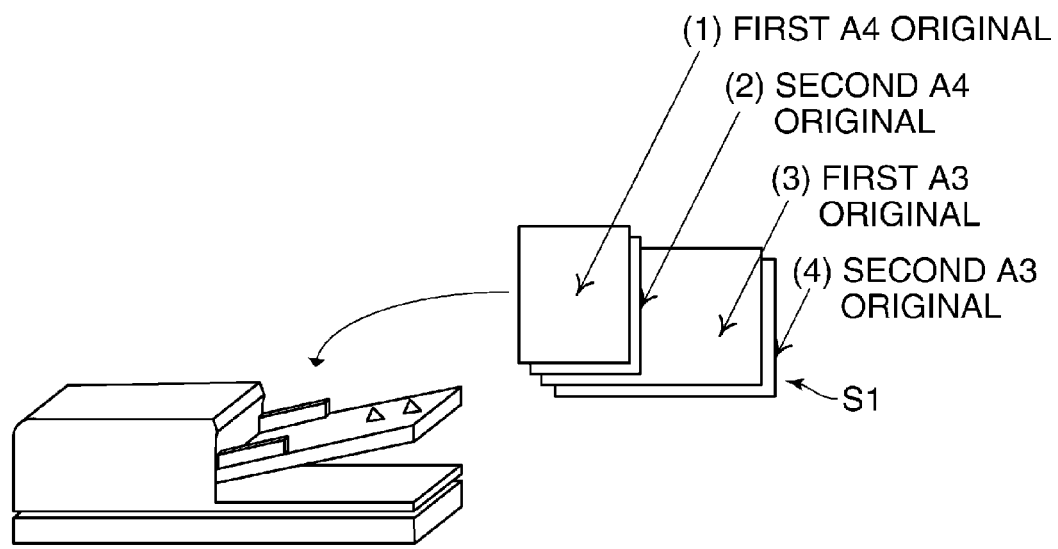
FIG. 8 is a view showing an example of an original bundle stacked on an original tray in FIG. 1.

FIG. 8 is a view showing an example of an original bundle S1 stacked on the original tray 128 in FIG. 1.

As shown in FIG. 8, the original bundle S1 consists of originals of sizes of A4, A4, A3, and A3 in the order of reading. The length of the original bundle S1 in the principal scanning direction stacked on the original tray 128 is detected as 297 mm (the length in the longitudinal direction of an A4 sheet) by the original width detection sensor 210 in the step S701. Furthermore, the length of the original bundle S1 in FIG. 8 in the principal scanning direction is determined as 297 mm in the step S706. When the prediction mode is the list reference mode, the size of the original that is read with reference to the predicted size list 500 in FIG. 5 using the determined length (297 mm) in the principal scanning direction is A4. Since the actual sizes of the originals of the original bundle S1 are A4, A4, A3, and A3, the predicted original size agrees with the actual original size for the first and second originals. Accordingly, since the first and second originals are read on the basis of the actual size of the originals, it is avoidable that a superfluous memory area is reserved in the image memory as compared with an actually needed memory area.

On the other hand, since the actual size of the third and fourth originals is A3, it does not agree with the predicted original size. In this case, the third and fourth originals need rereading, which degrades the throughput of reading originals.

If there is a setting to change the prediction mode when the reading of an original fails once, the prediction mode is changed from the list reference mode to the tray-size priority mode at the timing when the third original has been read. The size of the fourth original is predicted in the tray-size priority mode. Specifically, the size of the original is predicted with reference to the size specifying table 400 on the basis of the length of 297 mm in the principal scanning direction determined in the step S706 and the length in the auxiliary scanning direction obtained from the detection results of the original length detection sensors 126 and 127. The size of the fourth sheet in the original bundle S1 in FIG. 8 is predicted as A3.

The sizes of the first, second, and fourth originals in the original bundle S1 in FIG. 8 agree with the predicted sizes. Only the third original is reread. Accordingly, it is avoidable that a superfluous memory area is reserved in the image memory as compared with an actually needed memory area, and the degradation of the throughput of reading an original is minimized.

Figure 9:
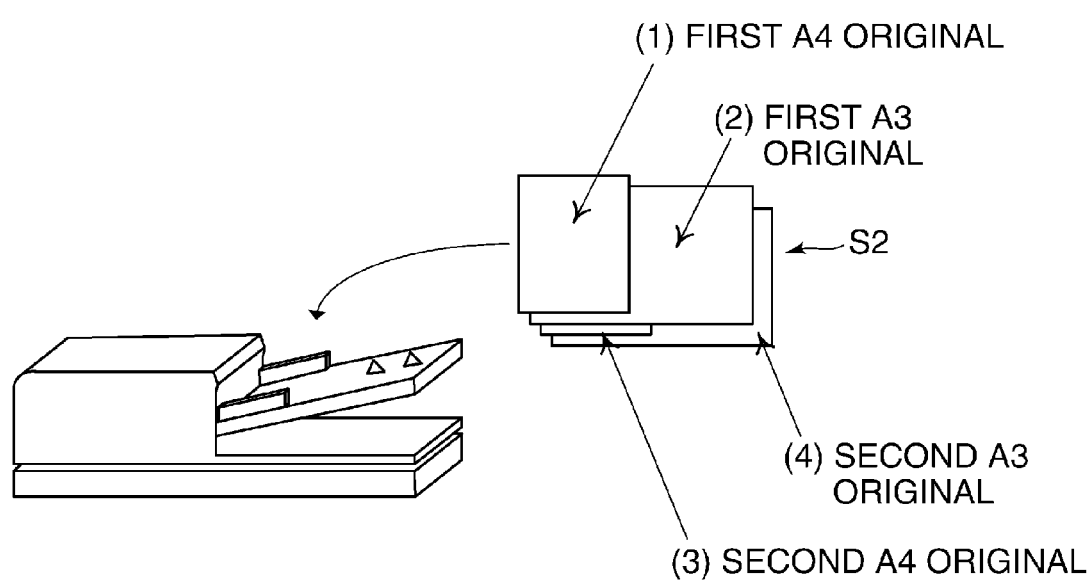
FIG. 9 is a view showing another example of an original bundle stacked on an original tray in FIG. 1.

FIG. 9 is a view showing an original bundle S2 that is different from the original bundle S1 in FIG. 8.

The original bundle S2 in FIG. 9 consists of originals of sizes of A4, A3, A4, and A3 in the order of reading. The length of the original bundle S2 in the principal scanning direction is determined as 297 mm.

When the prediction mode is the list reference mode, the size of the original that is read with reference to the predicted size list 500 in FIG. 5 using the determined length (297 mm) in the principal scanning direction is A4. The actual size of the first original is A4 and agrees with the predicted size. Next, the actual size of the second original is A3 and does not agree with the predicted size (A4). Accordingly, the second original will be reread. The actual size of the third original is A4 and agrees with the predicted size. The actual size of the fourth original is A3 and does not agree with the predicted original size. Accordingly, the fourth original will be also reread.

When an original size varies for each original to read like this, it is necessary to reread an original of which the actual size does not agree with the predicted size, which degrades the throughput of reading an original. Particularly, the throughput decreases as the number of originals that constitute the sheet bundle in which an original size varies for each original to read increases.

If the user sets that the prediction mode is changed when the reading of an original fails once as with the case in FIG. 8 beforehand, the prediction mode is changed from the list reference mode to the tray-size priority mode at the timing when the second original has been read. Accordingly, since the third and fourth originals are read with predicting that an original size is A3, the third original of A4 size that is smaller than A3 size and the fourth original of A3 size are read without failing. Accordingly, only the second original in the original bundle S2 in FIG. 9 needs rereading of an image. Since the predicted size for the third original is larger than the actual size of the third original, the reserved memory area is larger than the actually necessary memory area. However, degradation of the throughput of reading an original reading is avoidable.

Moreover, although the prediction mode may be changed at any times, it is preferable to limit the changing to only one time when an original size varies for each original to read as mentioned above. This eliminates the necessity to revise the reservation of the memory area frequently, which improves the throughput.

However, an original bundle like the original bundle S1 in FIG. 8 is used frequently rather than an original bundle like the original bundle S2 in FIG. 9, in general. Accordingly, the method of the embodiment is recommended. According to the method, the list reference mode is set up first, and the prediction mode is changed to the tray-size priority mode when the count of failures in reading an original reaches the predetermined count set by the user beforehand, Moreover, when an original bundle like the original bundle S2 in FIG. 9 is read in the list reference mode, the prediction mode is changed from the list reference mode to the tray-size priority mode when the reading fails once, and the prediction mode may not be changed from the tray-size priority mode to the list reference mode after that.

The description about FIG. 7B is continued. When the original is ejected to the sheet ejection tray 120 (step S716), the CPU 201 determines whether there is another original to read (step S717). When another original to read is not there (NO in the step S717), the CPU 201 finishes this process. On the other hand, when there is another original to read (YES in the step S717), the CPU 201 makes the conveyance of the next original start (step S718). Then, the CPU 201 determines the length of the conveyed original in the principal scanning direction (step S719) as with the process in the step S706. Furthermore, the CPU 201 determines whether the registration sensor 123 detects the front end of the original conveyed (step S720) as with the step S707. When the registration sensor 123 detects the front end of the original conveyed (YES in the step S720), the CPU 201 determines whether the prediction mode is the list reference mode (step S721). When the prediction mode is the list reference mode (YES in the step S721), the CPU 201 sets up a prediction size in the list reference mode (steps S722 and S724). When the prediction mode is not the list reference mode (NO in the step S721), the CPU 201 sets up a prediction size in the tray-size priority mode (steps S723 and S724). The prediction size of an original is set up as with the process in the step S708, and then, the CPU 201 returns the process to the step S709.

According to the process in FIG. 7A and FIG. 7B, when the list reference mode is set up as the prediction mode, the size of an original is predicted using the prediction list 500, and the original is read on the basis of the predicted original size. The predicted original size is selected from among a plurality of candidates of original sizes corresponding to the length of the original bundle S in the principal scanning direction. Namely, since the maximum size is not necessarily selected from among the plurality of candidates of the original sizes corresponding to the length of the original bundle S in the principal scanning direction, the reading of an original with the maximum size is not always performed. Accordingly, it is avoidable that a superfluous memory area is reserved in the image memory as compared with an actually needed memory area.

Moreover, since the list reference mode or the tray-size priority mode is set (steps S703 and S704) according to the process in FIG. 7A and FIG. 7B, a memory area is suitably reserved in the image memory.

Since the list reference mode is selected with priority higher than that of the tray-size priority mode in the embodiment, the maximum size is not always predicted as a size of an original to read, which avoids reservation of a superfluous memory area in the image memory.

When the count of disagreements between an original size predicted in the list reference mode and an actual original size reaches the predetermined count, the count that the size of the original which the predicted, the list reference mode is changed to the tray-size priority mode (steps S713 and S714) according to processing of FIG. 7A and FIG. 7B. Accordingly, probability of avoiding the disagreement between the predicted size and the actual size of the following originals increases, and it can reduce the time loss that occurs owing to failure in reading an original.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-004926, filed Jan. 14, 2015, which is hereby incorporated by reference herein in its entirety.

What is claimed is:

1. An original reading apparatus comprising:
an original tray on which an original bundle including a plurality of originals is stacked;
a conveyor configured to convey an original of the original bundle stacked on said original tray one by one along a conveyance path;
a image reading sensor configured to read the conveyed original;
a first detector configured to detect a length of the original in a first direction that intersects perpendicularly to a conveyance direction;
a second detector configured to detect a length of the original bundle stacked on said original tray in a second direction in which the original is conveyed;
a third detector provided on the conveyance path and configured to detect the original conveyed by said conveyor;
a processor;
a predictor configured to predict a size of the conveyed original using one mode among a plurality of prediction modes, which include a first prediction mode in which one size is selected as the size of the conveyed original from among a plurality of candidates of original sizes corresponding to the length of the original in the first direction detected by said first detector, by referring to a prediction list, and a second prediction mode in which the size of the conveyed original is predicted based on the length of the original in the first direction detected by said first detector and the length in the second direction detected by said second detector;
a specifier configured to specify the size of the conveyed original based on the length of the original in the first direction detected by said first detector and the length in the second direction detected by said second detector; and
a changer configured to change the prediction mode used by said predictor when the original size predicted by said predictor differs from the original size specified by said specifier,
wherein the processor operates to function as the predictor, the specifier, and the changer, and
the prediction list associates the length of the original in the first direction and the one size selected from among the plurality of candidates of original sizes corresponding to the length of the original in the first direction with each other.

2. The original reading apparatus according to claim 1, further comprising a rereader configured to make said image reading sensor reread the conveyed original based on the size specified by said specifier by controlling said conveyor and said image reading sensor when the original size predicted by said predictor differs from the original size specified by said specifier,
wherein the processor operates to function as the rereader.

3. The original reading apparatus according to claim 1, wherein said changer changes the prediction mode that said predictor uses when the count of disagreements between the original size predicted by said predictor and the original size specified by said specifier reaches a predetermined count.

4. The original reading apparatus according to claim 1, wherein said predictor uses the first prediction mode when a size mixed mode for reading an original bundle that includes originals of a plurality of different sizes is set up.

5. The original reading apparatus according to claim 1, wherein the one size which corresponds to the length of the original in the first direction in the prediction list is selectable from among the plurality of candidates of original sizes by a user.

6. The original reading apparatus according to claim 1, wherein said changer changes from one of the first prediction mode and the second prediction mode to the other only once.

7. A control method for an original reading apparatus equipped with an original tray on which an original bundle including a plurality of originals is stacked, the control method comprising:
conveying an original of the original bundle stacked on the original tray one by one along a conveyance path;
reading the conveyed original;
detecting a length of the original in a first direction that intersects perpendicularly to a conveyance direction;
detecting a length of the original bundle stacked on the original tray in a second direction in which the original is conveyed;
detecting the conveyed original with a sensor provided on the conveyance path;
predicting a size of the conveyed original using one mode among a plurality of prediction modes, which include a first prediction mode in which one size is selected as the size of the conveyed original from among a plurality of candidates of original sizes corresponding to the detected length of the original in the first direction, by referring to a prediction list, and a second prediction mode in which the size of the conveyed original is predicted based on the detected length of the original in the first direction and the detected length in the second direction;

specifying the size of the conveyed original based on the detected length of the original in the first direction and the detected length in the second direction; and changing the prediction mode used in said predicting when the original size predicted in said predicting differs from the original size specified in said specifying, wherein the prediction list associates the length of the original in the first direction and the one size selected from among the plurality of candidates of original sizes corresponding to the length of the original in the first direction with each other.

8. The control method for the original reading apparatus according to claim 7, further comprising rereading the conveyed original when the original size predicted in said predicting differs from the original size specified in said specifying.

9. The control method for the original reading apparatus according to claim 7, wherein the prediction mode that said prediction uses is changed in said changing when the count of disagreements between the original size predicted in said predicting and the original size specified in said specifying reaches a predetermined count.

10. The control method for the original reading apparatus according to claim 7, wherein the first prediction mode is used in said predicting when a size mixed mode for reading an original bundle that includes originals of a plurality of different sizes is set up.

* * * * *